3,356,726
S-(2-CHLOROETHYL) ISOTHIOCARBAMYL CHLORIDES AND PROCESS THEREFOR
Gerhard F. Ottmann, Hamden, and Haywood Hooks, Jr., West Haven, Conn., assignors to Olin Mathieson Chemical Corporation, a corporation of Virginia
No Drawing. Filed Aug. 17, 1964, Ser. No. 390,184
10 Claims. (Cl. 260—566)

ABSTRACT OF THE DISCLOSURE

S-(2-chloroethyl) isothiocarbamyl chlorides are provided in high yield and purity by the reaction of selected unsaturated organic compounds with S-chloro-isothiocarbamyl chlorides. The S-(2-chloroethyl) isothiocarbamyl chlorides are useful agricultural chemicals.

---

This invention relates to S-(2-chloroethyl) isothiocarbamyl chlorides having the following general formula:

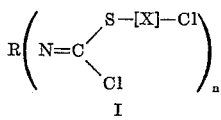

wherein R is an alkyl, cycloalkyl, aralkyl, aryl or substituted aryl group; X is an alkylene, substituted, alkylene, or cycloalkylene group; n is an integer from 1-2; and wherein the chlorine atom attached to the group represented by X is separated from the sulfur atom by two methylene moieties.

It has recently been established that a variety of S-chloro-isothiocarbamyl chlorides are provided by the reaction of various isothiocyanates and diisothiocyanates with a substantially equivalent amount of chlorine at low reaction temperatures in the presence of an inert solvent. A reaction temperature below 30° C. is utilized in these preparations. The reactions proceed as illustrated in the following equation wherein, for example, N-phenyl S-chloro-isothiocarbamyl chloride is prepared by adding chlorine to phenyl isothiocyanate:

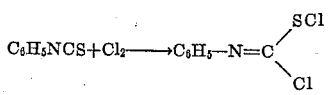

Examples 1 and 2 hereinafter illustrate the preparation of two of the aforementioned S-chloro-isothiocarbamyl chlorides. A more thorough and general description of the preparation of these derivatives is disclosed in our copending U.S. patent applications, Serial No. 354,789, filed Mar. 25, 1964 now abandoned and Serial No. 370,051, filed May 25, 1964 now U.S. Patent No. 3,328,462.

The resulting S-chloro-isothiocarbamyl chlorides are somewhat sensitive to degradation by heat, but they are surprisingly stable if handled properly. It has now been found that these derivatives can be reacted with a number of unsaturated hydrocarbons to provide the S-(2-chloroethyl) isothiocarbamyl chlorides of this invention. These reactions are conveniently preformed, and the derivatives (I) are provided in high yield and purity. The S-(2-chloroethyl) isothiocarbamyl chlorides are particularly valuable derivatives for use in various agricultural applications.

The reactions disclosed herein proceed in accordance with the following equation wherein, for example, a S-chloro-isothiocarbamyl chloride is reacted with the simplest unsaturated hydrocarbon, ethylene.

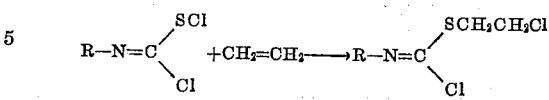

Similarly cyclohexene, a typical unsaturated alicyclic hydrocarbon reacts in accordance with the following scheme:

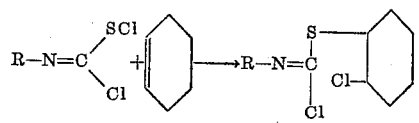

While a wide variety of S-chloro-isothiocarbamyl chlorides having the formulas RNC(Cl)SCl and $$R[NC(Cl)SCl]_2$$

wherein R is as previously defined, may be used as starting reactants in the practice of this invention, it is preferred to utilize certain of these derivatives. Thus, preferred reactants are those wherein R is alkyl having 1–18 carbon atoms, cyclohexyl, aryl having 6–8 carbon atoms such as phenyl, tolyl and xylyl, phenyl having a lower alkoxy (1–3 carbon atoms) substituent, halogenated phenyl and nitrated phenyl. The preparation of these preferred S-chloro-isothiocarbamyl chlorides and others are disclosed in the aforementioned copending U.S. patent applications.

Similarly, a number of unsaturated hydrocarbons may be utilized in the reaction with the above disclosed S-chloro-isothiocarbamyl chlorides to provide S-(2-chloroethyl) isothiocarbamyl chlorides in accordance with this invention. Thus, straight chain and branched aliphatic olefins having 2–18 carbon atoms as well as unsaturated alicyclic hydrocarbons having 5–12 carbon atoms are especially useful in providing derivatives of the Formula I. Miscellaneous other olefins having certain halogen, alkoxy and aryl substituents are also available and useful in the preparation of S-(2-chloroethyl) isothiocarbamyl chlorides.

Thus, included among the olefins which may be used in the practice of this invention are:

ethylene,
propylene,
butene-1,
butene-2,
isobutylene,
pentene-1,
methyl butene,
hexene-1,
dimethyl butene,
methyl pentene,
heptene-1,
dimethyl pentene,
octene-1,
trimethyl pentene,
ethyl hexene,
methyl heptene,
nonene-2,
decene-1,
trimethyl heptene,
methyl ethyl heptene,
dimethyl octene,
undecene-1,
dodecene-1,
tri-isobutylene, tridecene-1,
tetradcene-1,
pentadecene-1,
hexadecene-1,
heptadecene-1 and
octadecene.

Cyclohexene, cycloheptene, cyclooctene and cyclododecene are also illustrative of the unsaturated alicyclic hydrocarbons useful in preparing derivatives having the Formula I.

Other substituted olefins which are advantageously used in the practice of this invention are 3-chloro-propene-1, 3-bromo-propene-1, 3-chloro-2-methyl-propene-1, styrene, α-methyl styrene, chlorostyrene, methoxystyrene, and vinyl alkyl ethers wherein the alkyl substituent has 1–4 carbon atoms, i.e., vinyl ethyl ether.

The preparation of the S-(2-chloroethyl) isothiocarbamyl chlorides of this invention is readily performed by contacting the S-chloroisothiocarbamyl chlorides with the unsaturated reactants at a reaction temperature range of about −10°–50° C. Preferably, a reaction temperature range of 0°–30° C. is employed. When both reactants are liquids, the reaction is conveniently carried out in the absence of a diluent or solvent. However, the use of an inert solvent is usually advantageous in the preparation of the chlorides (I). Among the preferred solvents which are suitable for use in the process disclosed herein are aliphatic and aromatic hydrocarbons such as hexene, benzene, toluene, etc.; halogenated hydrocarbons such as carbon tetrachloride, dichloroethane and the like; and various ethers such as diethyl ether.

The following examples will serve to illustrate the preparation of several of the S-(2-chloroethyl) isothiocarbamyl chlorides of this invention.

Example 1

A 250 ml. three-necked flask, equipped with gas inlet tube, stirrer, thermometer and a Dry Ice condenser was charged with 67.6 g. (0.5 mole) of phenyl isothiocyanate and 67 ml. of chloroform. An amount of 35.5 g. (0.5 mole) of chlorine gas was passed into this solution at a rate of 7.0 to 7.5 grams per hour while the solution was effectively stirred and a reaction temperature of 15° to 18° C. was maintained. After the addition of chlorine was completed, the yellow reaction solution was stored for 14 to 20 hours at −20° to −30° C. A small amount of a fluffy precipitate was then filtered from the reaction mixture. The chloroform was removed from the filtrate in vacuo at temperatures not exceeding 20° C. The remaining yellow oil was mixed with 350 ml. of dry ether, and another small portion of a yellow precipitate was removed by filtration. The ether was removed from the filtrate in vacuo at temperatures not exceeding 20° C., and the residual oil was then mixed with 400–500 ml. of n-hexane. A small amount of solid precipitate was removed from this mixture by filtration and the n-hexane was removed from the filtrate in vacuo under 20° C. A clear yellow liquid in the amount of 94.5 g. (91.5% yield) was thus obtained. The following analytical data revealed that the desired N-phenyl S-chloro-isothiocarbamyl chloride had been obtained in high purity.

*Analysis.*—Calcd. for $C_7H_5Cl_2NS$: C, 40.79; H, 2.44; Cl, 34.45; N, 6.87; S, 15.52. Found: C, 40.78; H, 2.42; Cl, 34.40; N, 6.89; S, 15.44.

*Molecular weight by cryoscopic procedure.*—Calcd. for $C_7H_5Cl_2NS$: 206.12. Found: 206.0.

Example 2

A solution of 36.0 g. (0.187 mole) of p-phenylene diisothiocyanate in 325 ml. of chloroform was treated with 26.6 g. (0.374 mole mole) of chlorine under conditions described in Example 1. The reaction mixture was allowed to stand for 14 to 20 hours at −20° to −30° C., and was then filtered from minute amounts of a precipitate. The solvent was removed from the filtrate in vacuo at a temperature not exceeding 20° C. The remaining crystalline solid amounted to 61.2 g. (97.8% of theoretical yield). This material was recrystallized from n-hexane to provide 43.0 g. of a yellow crystalline product melting at 82°–83° C. The following analytical data revealed that the desired N,N'-p-phenylene-bis(S-chloro-isothiocarbamyl chloride) had been obtained in high purity.

*Analysis.*—Calcd. for $C_8H_4Cl_4N_2S_2$: C, 28.75; H, 1.21; Cl, 42.49; N, 8.38; S, 19.15. Found: C, 28.99; H, 1.30; Cl, 42.6; N, 8.36; S, 19.24.

Example 3

An amount of 103 g. (0.5 mole) of N-phenyl S-chloro isothiocarbamyl chloride was dissolved in 100 ml. of carbon tetrachloride. A slow stream of ethylene was passed into this stirred solution at such a rate that a reaction temperature of 30° to 40° C. was maintained. Passage of the gas was discontinued after the temperature of the reaction mixture had dropped to 25° C. Then the solvent was removed by distillation in vacuo at a bath temperature of 20° C. leaving 97 g. of a slightly yellow colored oil which was added to 1000 ml. of n-hexane. The solution was filtered from an insoluble yellow solid, and then the solvent was removed in vacuo at a bath temperature not exceeding 20° C. An almost colorless oil in the amount of 77.7 g. was obtained as a residue. The following analytical data revealed that S-(2-chloroethyl)-N-phenyl isothiocarbamyl chloride had been obtained; $n_D^{20}$ 1.6063; yield, 67%.

*Analysis.*—Calcd. for $C_9H_9Cl_2NS$: C, 46.35; H, 3.86; Cl, 30.2; N, 5.96; S, 13.67. Found: C, 47.03; H, 3.89; Cl, 29.7; N, 5.81; S, 13.51.

Example 4

A solution of 103 g. (0.5 mole) of N-phenyl S-chloro isothiocarbamyl chloride in 50 ml. of carbon tetrachloride was added dropwise to a stirred solution of 35 g. (0.5 mole) of 1-pentene in 50 ml. of carbon tetrachloride while a reaction temperature of 25°–30° C. was maintained by means of a cooling bath. After complete addition, the mixture was stirred overnight at room temperature, and then the solvent was stripped in vacuo at 20°–25° C. The remaining tan colored oil (131.0 g.) was dissolved in 1500 ml. of n-hexane, filtered from a small amount of insoluble precipitate, and then concentrated again to afford 125 g. (91% yield) of S-(2-chloropentyl) N-phenyl isothiocarbamyl chloride.

*Analysis.*—Calcd. for $C_{12}H_{15}Cl_2NS$: C, 52.20; H, 5.47; Cl, 25.7; N, 5.07; S, 11.58. Found: C, 53.0; H, 5.50; Cl, 25.2; N, 5.03; S, 11.88.

Example 5

To a solution of 16.4 g. (0.2 mole) of cyclohexene in 20 ml. of carbon tetrachloride was added dropwise with stirring 41.2 g. (0.2 mole) of N-phenyl S-chloro isothiocarbamyl chloride. The reaction which is very exothermic was moderated by an external cooling bath and maintained between 25°–32° C. After the addition was completed, the reaction mixture was allowed to stand at room temperature for an additional hour. Then the solvent was stripped in vacuo, and the oily residue amounting to 53 g. was dissolved in 75 ml. of dry pentane. Upon cooling of this solution to −70° C., a total of 39.4 g. of S-(2-chlorocyclohexyl)-N-phenyl isothiocarbamyl chloride precipitated in the form of white crystals which were separated by filtration using a precooled Buchner funnel; M.P. 31°–32° C., yield: 68.5%.

*Anaylsis.*—Calcd. for $C_{13}H_{15}Cl_2NS$: C, 54.16; H, 5.25; Cl, 24.63; N, 4.86; S, 11.10. Found: C, 54.48; H, 5.42; Cl, 24.60; N, 5.01; S, 11.69.

Example 6

Solutions of 103 g. (0.5 mole) of N-phenyl S-chloro isothiocarbamyl chloride in 100 ml. of carbon tetrachloride and 52.1 g. (0.5 mole) of styrene in 59 ml. of carbon tetrachloride were reacted as described in Example 5, to afford 136 g. of a light yellow oil as a crude reaction product. The oil was extracted with 250 ml. of pentane, and the resulting solution was decanted from a small amount of insoluble oil. The clear solution was cooled to provide crystals which were collected by filtration. These crystals were recrystallized twice from n-pentane to yield a total of 100.0 g. (65% yield) of pure S-(2-chloro-2-phenyl ethyl)-N-phenyl isothiocarbamyl chloride; M.P. 49°–50° C.

*Analysis.*—Calcd. for $C_{15}H_{13}Cl_2NS$: C, 58.1; H, 4.22; Cl, 22.9. Found: C, 58.37; H, 4.25; Cl, 23.0.

Example 7

Solutions of 30.0 g. (0.125 mole) of N-(p-chlorophenyl) S-chloro isothiocarbamyl chloride in 30 ml. of carbon tetrachloride and 10.8 g. (0.132 mole) of cyclohexene in 10 ml. of carbon tetrachloride were reacted as described in Example 5. The crude reaction product which consisted of 38.5 g. of a tan colored, highly viscous oil was crystallized by extracting it with 35 ml. of an n-pentane and cooling the resulting pentane solution to provide colorless crystals. After these crystals were recrystallized twice from n-heptane, a total of 26 g. (64% yield) of pure S-(2-chlorocyclohexyl) - N - (p-chlorophenyl) isothiocarbamyl chloride, M.P. 43°–44° C., was obtained.

*Analysis.*—Calcd. for $C_{13}H_{14}Cl_3NS$: C, 48.45; H, 4.38; Cl, 33.0; S, 9.52. Found: C, 48.56; H, 4.47; Cl, 32.8; S, 9.91.

Example 8

Amounts of 27.5 g. (0.1 mole) of N-(2,5-dichlorophenyl) S-chloro isothiocarbamyl chloride dissolved in 25 ml. of carbon tetrachloride and 8.5 g. (0.104 mole) of cyclohexene dissolved in 10 ml. of carbon tetrachloride were reacted according to Example 5, yielding 35 g. of an oily reaction product. This oil was dissolved in 35 ml. of n-pentane, and the solution was cooled to 0° C. to yield a crystalline product. This material was recrystallized twice from n-pentane to provide 25 g. (70% yield) of S-(2-chlorocyclohexyl)-N-(2,5 - dichlorophenyl) isothiocarbamyl chloride, M.P. 58°–59° C., in the form of white crystals.

*Analysis.*—Calcd. for $C_{13}H_{13}Cl_4NS$: Cl, 39.8; S, 8.96. Found: Cl, 39.5; S, 8.97.

Example 9

A solution of 23 g. (0.124 mole) of N-butyl S-chloro isothiocarmabyl chloride in 50 ml. of sodium dried ether was added dropwise to a stirred solution of 10.5 g. (0.128 mole) of cyclohexene in 25 ml. of carbon tetrachloride while the temperature of the reaction mixture was maintained at 10°–15° C. When the reaction was no longer exothermic, the external cooling bath was removed and the mixture was allowed to stand at room temperature for one additional hour. The solvents were evaporated in vacuo at a temperature not exceeding 15° C. The remaining oil (29 g.) was dissolved in 100 ml. of pentane and filtered from 3 g. of a solid. Evaporation of the solvent afforded 26 g. (78% yield) of pure S-(2-chlorocyclohexyl)-N-butyl isothiocarbamyl chloride in the form of an almost colorless oil, $n_D^{26}$ 1.5240.

*Analysis.*—Calcd. for $C_{11}H_{19}Cl_2NS$: C, 49.23; H, 7.15; Cl, 26.4; S, 11.91. Found: C, 49.70; H, 7.13; Cl, 26.2; S, 12.14.

Example 10

Amounts of 33 g. (0.156 mole) of N-cyclohexyl S-chloro isothiocarbamyl chloride and 12.7 g. (0.156 mole) of cyclohexene each dissolved in 25 ml. of carbon tetrachloride were reacted and purified as described in Example 9 affording 21 g. of crude S-(2-chlorocyclohexyl)-N-cyclohexyl isothiocarbamyl chloride as evidenced by infrared and nuclear magnetic resonance spectroscopy analysis.

Example 11

A solution of 17 g. (0.049 mole) of toluene-2,4-bis(S-chloro isothiocarbamyl chloride) in 50 ml. of carbon tetrachloride was added dropwise to a stirred solution of 8.6 g. (0.105 mole) of cyclohexene in 50 ml. of carbon tetrachloride while the temperature of the reaction mixture was controlled at 25°–30° C. After removal of the solvent, the remaining oil was dissolved in pentane and filtered from insoluble by-products. After evaporation of the solvent, crude bis[S-(2-chlorocyclohexyl)]-N,N'-(2,4-toluylene) isothiocarbamyl chloride was obtained in the form of a heavy oil.

*Analysis.*—Calcd. for $C_{21}H_{26}Cy_4N_2S_2$: Cl, 27.8; S, 12.5. Found: Cl, 29.8; S, 11.68.

The S-(2-chloroethyl)isothiocarbamyl chlorides of this invention are valuable agricultural chemicals. For instance, they are unusually effective nematocides in controlling the root-knot eelworm Meloidogyne incognita on tomato plants when applied to the soil surrounding such plants.

The chlorides (I) have also been found to be effective foliar fungicides, being particularly useful in preventing the germination of cucumber powdery mildew on control plants. The derivatives of this invention also possess herbicidal activity when applied to a variety of weed and crop species both in the form of pre-emergence and post-emergence treatments.

What is claimed is:

1. A S-(2-chloroethyl) isothiocarbamyl chloride having the formula

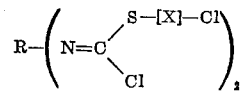

wherein R is phenylene or toluylene; X is selected from the class consisting of an alkylene group having 2–18 carbon atoms or cycloalkylene having 5–12 carbon atoms; and wherein said chlorine atom atttached to X is separated from the sulfur atom by two methylene groups.

2. A S-(2-chloroethyl) isothiocarbamyl chloride of claim 1 wherein R represents toluylene and X represents cycloalkylene having 5–12 carbon atoms.

3. A process for preparing a S-(2-chloroethyl) isothiocarbamyl chloride which comprises reacting (a) a S-chloro-isothiocarbamyl chloride of the formula

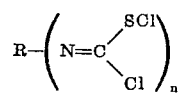

wherein R is selected from the class consisting of alkyl having 1–18 carbon atoms, phenyl, tolyl, xylyl, cyclohexyl, monohalophenyl, dichlorophenyl, dibromophenyl, nitrophenyl and alkoxyphenyl with said alkoxy group having 1–3 carbon atoms; and $n$ is an integer of 1 or 2; with (b) an unsaturated organic compound selected from the class consisting of an aliphatic olefin having one C=C bond and having 2–18 carbon atoms, a cycloalkene having one C=C bond having 5–12 carbon atoms, a vinyl alkyl ether having 1–4 carbon atoms in said alkyl group, and an unsubstituted aliphatic olefin having 2–3 carbon atoms and being substituted by a member of the group consisting of chlorine, bromine, phenyl, chlorophenyl and methoxyphenyl; at a reaction temperature range of about −10° C. to 50° C. and recovering said S-(2-chloroethyl) isothiocarbamyl chloride from the reaction mixture.

4. The process of claim 3 wherein an inert organic solvent is employed.

5. The process of claim 3 wherein a preferred temperature range of 0°–30° C. is utilized.

6. The process of claim 3 wherein $n$ in the utilized S-chloro-isothiocarbamyl chloride represent the integer 1.

7. The process of claim 6 wherein styrene is employed as the unsaturated organic compound.

8. The process of claim 6 wherein an aliphatic olefin having one C=C bond and having 2–18 carbon atoms is employed as the unsaturated organic compound.

9. The process of claim 6 wherein a cycloalkene having one C=C bond and having 5–12 carbon atoms is employed as the unsaturated organic compound.

10. The process of claim 9 wherein cyclohexene is employed as the cycloalkene reactant.

References Cited

UNITED STATES PATENTS 3,180,890  4/1965  Enders et al. -------- 260—566

OTHER REFERENCES

Kharasch et al., "Journal American Chemical Society," vol. 71, pp. 2724–2728 (1949).

CHARLES B. PARKER, *Primary Examiner.*

R. V. HINES, *Assistant Examiner.*